United States Patent [19]
Schultheiss

[11] Patent Number: 6,151,490
[45] Date of Patent: Nov. 21, 2000

[54] METHODS AND SYSTEMS FOR PROVIDING AUDIO AND VIDEO TELEPHONE COMMUNICATIONS USING A PERSONAL COMPUTER AND A TELEVISION

[75] Inventor: Christopher J. Schultheiss, New Smyrna Beach, Fla.

[73] Assignee: Douglas G. Brown, Cherryville, N.C.

[21] Appl. No.: 08/759,313

[22] Filed: Dec. 2, 1996

[51] Int. Cl.[7] .................................................. H04M 11/00
[52] U.S. Cl. ........................... 455/403; 455/419; 455/420
[58] Field of Search .................................. 348/14, 19, 17; 358/160, 85; 379/93, 56, 102.01, 102.03; 341/176; 455/403, 418–420

[56] References Cited

U.S. PATENT DOCUMENTS

| | | | |
|---|---|---|---|
| 4,751,578 | 6/1988 | Reiter et al. | 357/183 |
| 5,014,128 | 5/1991 | Chen | 358/165 |
| 5,065,425 | 11/1991 | Lecomte et al. | 379/93 |
| 5,138,649 | 8/1992 | Kirshbergh et al. | 379/56 |
| 5,192,999 | 3/1993 | Graczyk et al. | 358/85 |
| 5,283,819 | 2/1994 | Glick et al. | |
| 5,293,357 | 3/1994 | Hallenbeck | 348/734 |
| 5,570,415 | 10/1996 | Stretton et al. | 379/110 |
| 5,606,361 | 2/1997 | Davidsohn et al. | 348/14 |
| 5,648,781 | 7/1997 | Choi | 341/146 |
| 5,703,636 | 12/1997 | Cifaldi | 348/14 |
| 5,706,334 | 1/1998 | Balk et al. | 379/67 |
| 5,760,824 | 6/1998 | Hicks, III | 348/14 |
| 8,678,772 | 7/1996 | Schultheiss | 348/552 |

OTHER PUBLICATIONS

U.S. application No. 08/678,772, Schultheiss, filed Jul. 11, 1996.

*Primary Examiner*—Salvatore Cangialosi
*Attorney, Agent, or Firm*—Myers Bigel Sibley & Sajovec

[57] ABSTRACT

A personal computer is used to provide audio and/or video telephone communications. Audio telephone communications are provided by using a personal computer to relay audio telephone communications between external telephone networks and a unified television/personal computer wireless remote control. A personal computer may also be used to relay audio and/or video telephone communications between external telephone networks and a television. For video telephone communications, a television interface unit is provided which includes a wireless communications transceiver, a camera and a microphone. An infrared converter may also be included to convert received television commands into infrared television commands.

27 Claims, 2 Drawing Sheets

METHODS AND SYSTEMS FOR PROVIDING AUDIO AND VIDEO TELEPHONE COMMUNICATIONS USING A PERSONAL COMPUTER AND A TELEVISION

FIELD OF THE INVENTION

This invention relates to television systems and methods, and more particularly to remote control systems and methods for television.

BACKGROUND OF THE INVENTION

The television (TV) has become ubiquitous in modern society. As a result, many additional services are being provided via television. One example of an additional service which is being provided via television is an online television program guide, wherein television program schedule information is displayed on a television for searching and selection by a television viewer. Online television program guides are described in U.S. Pat. No. 4,751,578 to Reiter et al. entitled "System for Electronically Controllably Viewing on a Television Updateable Television Programming Information" and U.S. Pat. 5,293,357 to Hallenbeck entitled "Method and Apparatus for Controlling a Television Program Recording Device", the disclosures of both of which are hereby incorporated herein by reference. Other services which are being provided or have been proposed in connection with television include interactive video, video games, online stock quotation and/or banking, and video-on-demand.

The telephone has also become ubiquitous in modern society. Audio telephone communications are almost universal and video telephones are now becoming widespread. With the widespread availability of the personal computer, it is also known to provide audio and video telephone communications on a personal computer which is connected to a telephone network, which may be the internet.

SUMMARY OF THE INVENTION

The present invention provides audio and/or video telephone communications using a personal computer as a relay. The present invention provides audio telephone communications by using a personal computer to process and relay audio telephone communications between external telephone networks and a unified television/personal computer wireless remote control. A personal computer may also be used to process and wirelessly relay audio and/or video telephone communications between external telephone networks and a television.

The invention stems from the realization that a large amount of computer power and memory is typically already present in the home, in the form of a personal computer. Accordingly, a personal computer is used to download and process audio and/or video telephone communications. The invention also stems from the realization that the television, rather than a personal computer, is often the focal point for individual and family gatherings. Accordingly, the television is used for audio and/or video telephone communications.

In particular, according to the present invention, a personal computer includes a housing containing therein a processor and memory. A computer display is responsive to the processor. A telephone interface is also contained in the housing, which obtains telephone communications from an external telephone network and which sends telephone communications to the external network. A wireless communications transceiver is also included in the housing.

The wireless communications transceiver is responsive to the processor and to the telephone interface. The wireless communications transceiver wirelessly transmits telephone communications which are obtained from the external network to external of the housing, and wirelessly receives telephone communications from external of the housing and provides the received telephone communications to the telephone interface. The wireless communications transceiver may also include a remote control receiver which is responsive to wireless television remote control signals, to control the processor and manipulate information in the memory. Accordingly, the personal computer is used to relay telephone communications. The telephone communications may be audio telephone or video telephone communications and may use an external wire telephone network or the internet.

In a first embodiment of the present invention, the personal computer is used in combination with a unified television/personal computer/telephone wireless remote control. The unified remote control transmits infrared television remote control commands to a television in response to user inputs. The unified remote control also transmits personal computer commands to the wireless communications transceiver in response to user inputs. The unified remote control also communicates telephone communications with the wireless communications transceiver. Accordingly, the unified remote control includes therein an audio telephone handset comprising a microphone and a speaker. Personal computer commands and audio telephone communications are preferably communicated between the personal computer and the unified remote control using radio frequency communications.

In a second embodiment according to the present invention, a personal computer is used to relay video telephone communications between a telephone network and a television. An integrated television/telephone/personal computer wireless remote control transmits personal computer commands, television remote control commands and telephone control commands to the personal computer, preferably using radio frequencies. A television interface unit is also provided. The television interface unit includes a wireless communications receiver which receives telephone communications from the personal computer and which also receives television remote control commands from the personal computer. A converter is responsive to the wireless communications receiver to convert the received television remote control commands into infrared television remote control commands.

The television interface unit also includes a video camera and a microphone which are used to produce a video telephone signal. A wireless communications transmitter in the television interface unit is responsive to the video camera and to the microphone to transmit video telephone communications to the personal computer. Thus, when a user or group of users is gathered around a television, the television interface unit allows the unified remote control to be used to control the personal computer and the television interface unit to provide audio and/or video telephone communications.

It will be understood that the unified remote control and the personal computer interface preferably use radio frequency (such as UHF) transceivers so that signals and commands may be transmitted from room to room without requiring direct line of sight. Typically, the personal computer may not be in a line of sight with the television. If commands are transmitted in a line of sight from the integrated remote control to the television, these commands may be transmitted using infrared signals.

The second embodiment of the present invention can provide a video telephone system using a personal computer and a television. The video telephone system includes a personal computer interface which is adapted for use with a personal computer. The personal computer interface includes a video telephone network interface and a radio frequency transceiver which transmits video telephone communications and receives video telephone communications. The system also includes a television interface which is adapted for use with a television. The television interface includes a radio frequency transceiver which receives video telephone communications from the personal computer interface, and which applies the received video telephone communications to a television for display. The television interface also includes a video camera and a microphone to provide video telephone communications to the television interface transceiver, for transmission to the personal computer interface.

A wireless remote control includes a user interface which accepts users input commands to remotely control a television. The wireless remote control also includes a radio frequency transmitter which transmits radio frequency remote control signals to the personal computer interface, to thereby remotely control the personal computer in response to user input commands at the user interface. The personal computer interface also relays received television remote control signals to the personal computer, and receives television remote control signals from the personal computer. The personal computer interface also receives personal computer commands from the radio frequency transceiver and relays the personal computer commands to a personal computer.

In a preferred embodiment, the personal computer interface is contained on a card which connects to a personal computer motherboard in a personal computer housing. Also in a preferred embodiment, the television interface unit includes a radio frequency switch which switches the video input to a television between the received television video signals and an external video source. Also preferably, the wireless remote control user interface accepts user input commands to remotely control the personal computer. The UHF transmitter also transmits UHF personal computer control signals to a personal computer, to remotely control a personal computer in response to user input commands at the user interface. An online television program guide or other television accessory service may be implemented by software which executes on the personal computer.

A wireless remote control may be provided according to the present invention. The wireless remote control includes a housing and a user interface in the housing which accepts user input commands. An audio telephone handset is also included in the housing. The audio telephone handset includes a microphone and a speaker. A radio frequency transceiver is also included in the housing. The radio frequency transceiver transmits radio frequency remote control signals in response to user input commands at the user interface. The radio frequency transceiver also transmits and receives audio telephone communications to and from the audio telephone handset. An infrared transmitter is also included in the housing, which transmits infrared remote control signals in response to user input commands at the user interface.

The user interface preferably includes a plurality of keys. The radio frequency transceiver is responsive to activation of at least one of the keys and the infrared transmitter is responsive to activation of at least one of the keys. The radio frequency transceiver and the infrared transmitter may both be responsive to activation of at least one of the keys. The user interface may also include a trackball and the radio frequency transceiver is responsive to activation of the trackball. The user interface may include a television program guide activation key so that the radio frequency transceiver is responsive to activation of the television program guide activation key, to transmit a command to a personal computer to activate a television program guide in the personal computer. The infrared transmitter is responsive to activation of the television program guide activation key, to transmit a command to a television to tune into a television channel which will receive the television program guide from the personal computer.

Methods of providing telephone communications using a personal computer according to the invention, obtain at the personal computer, telephone communications from an external telephone network. Remote control signals are wirelessly received at the personal computer in response to user inputs at a wireless remote control. The telephone communications are wirelessly transmitted from the personal computer to a television or to the wireless remote control. Audio telephone communications or video telephone communications may be obtained from the external telephone network. The external telephone network may be a wire telephone network or the internet. Preferably, video telephone communications are wirelessly transmitted to the television and audio telephone communications are wirelessly transmitted to the wireless remote control. Video telephone communications are wirelessly received at the personal computer from a remote unit which contains a camera and microphone.

Accordingly, the power, memory and communications connectivity of a personal computer, and the ubiquitous presence of a television with a wireless remote control, are used for audio and video telephone communications. A user or group of users who are gathered around a television may thereby participate in audio or video telephone conferences without requiring expensive add-on units and/or expensive televisions which contain high power computer processing and memory.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
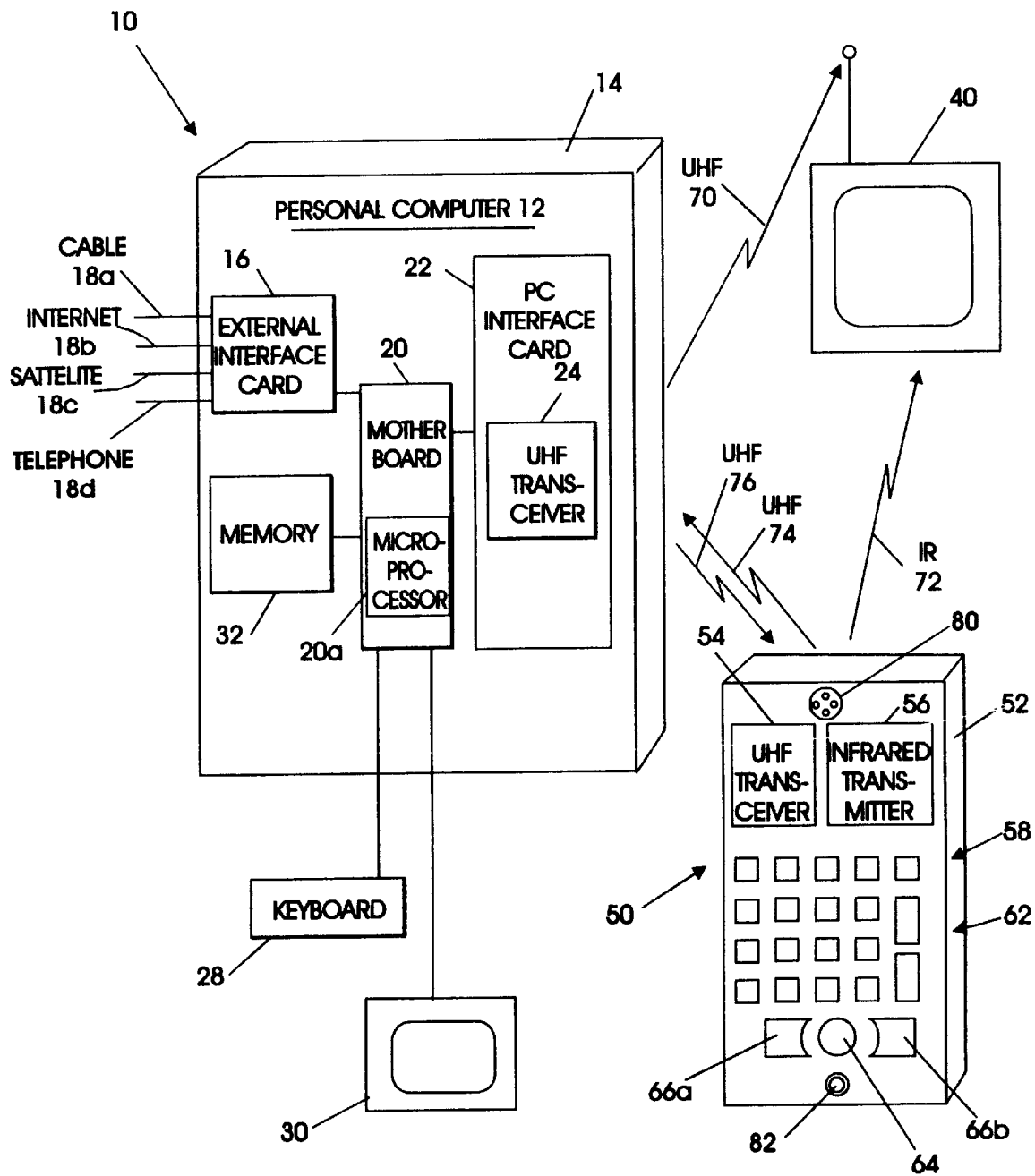
FIG. 1 illustrates a first embodiment of systems and methods for providing audio telephone communications using a personal computer according to the present invention.

Referring now to FIG. 1, a first embodiment of a system for providing audio telephone communications using a personal computer and a television is illustrated. As shown in FIG. 1, system 10 includes a personal computer 12, a television 40 and a wireless remote control 50. Personal computer 12 includes a personal computer housing 14 and a motherboard 20. The motherboard may include a microprocessor 20a thereon. A keyboard 28, display 30 and other conventional personal computer hardware and software may be included. Memory 32, in the form of semiconductor memory (DRAM, SRAM, EEPROM, etc.), magnetic memory (floppy and hard disk drives), optical memory (CDROM) and other conventional memory may be provided.

Personal computer 12 also includes an external interface card 16 which may plug into motherboard 20 and which obtains external information from external networks such as cable TV network 18a, internet 18b, satellite TV network 18c, and telephone networks 18d. Other network connections may also be provided, for point-to-point (private) communications, or point-to-multipoint teleconferencing. Personal computer 12 also includes a PC interface card 22 which may also plug into motherboard 20. PC interface card 22 includes a radio frequency (preferably UHF) transceiver 24. As will be described below, UHF transceiver 24 functions as a telephone communications transceiver and as a remote control receiver. External interface card 16 and PC interface card 22 may be combined into a single card.

UHF transceiver 24 transmits information as UHF signals 70 to TV 40. The UHF signals may be a conventional television program which is obtained from cable interface 18a or satellite interface 18c, or may be internet data from internet interface 18b. This information may be passed directly to UHF transmitter 24 from external interface card 16. Alternatively, some or all of this information may be stored in memory 32 and then transmitted to TV 40 under remote control or under control of the personal computer. The UHF carrier may be modulated by the video signal, and audio may be superimposed on a subcarrier. Similarly, the control codes may also be superimposed on a subcarrier. The design of the individual component parts of personal computer 12 are well known to those having skill in the art and need not be described in greater detail herein.

Still referring to FIG. 1, wireless remote control 50 includes a remote control housing 52 and a user interface in the housing which accepts user input commands. As shown in FIG. 1, the user interface includes a plurality of keys 58 and 62, a trackball 64 and trackball keys 66a and 66b, as will be described in detail below. However, it will be understood by those having skill in the art that other user inputs may be provided via touch screen, voice activation and the like.

Wireless remote control 50 includes an audio telephone handset, including speaker 80 and microphone 82. The speaker may be an ear speaker and/or a speakerphone speaker. Wireless remote control 50 also includes a radio frequency (preferably UHF) transceiver 54 which transmits UHF remote control signals 74 to personal computer 12 in response to user input commands at the user interface. An infrared transmitter 56 in the housing 52, transmits infrared remote control signals 72 to the television in response to user input commands at the user interface. Infrared remote control signals may also be transmitted to a videocassette recorder or other device. In another embodiment, a UHF transmitter 54 is not included, and infrared commands 74 are transmitted to the personal computer. In this embodiment, a separate infrared remote control receiver may be provided in the personal computer housing 14.

Audio telephone communications are provided by the system of FIG. 1 using personal computer 12 to process and relay audio telephone communications between external telephone networks and the unified television and personal computer remote control 50. In particular, audio telephone communications may be provided by wire telephone network 18d, via the internet 18b, via cable connection 18a or satellite connection 18c. UHF transceiver 24 wirelessly transmits the audio telephone communications from personal computer 12 to remote control 50, as UHF signal 76. Remote control 50 receives the telephone communications via UHF transceiver 54 and provides a received telephone communication to speaker 80. Similarly, telephone communications are obtained from microphone 82 and transmitted by UHF transceiver 54 in unified remote control 50, to the UHF transceiver 24 in personal computer 12, as UHF signal 74. The audio telephone communications are then provided back to the external telephone network connection via external interface card 16. Accordingly, remote control 50 acts as an audio telephone handset in addition to acting as a remote control, and personal computer 12 relays the audio telephone communications. Personal computer 12 may also process the audio telephone communications, for example, to perform noise filtering.

In the embodiment of FIG. 1, remote control 50 is capable of operating certain keys in the infrared mode and other keys in the UHF mode. Some keys may operate in both modes. In the embodiment shown in FIG. 1, top keys 58 operate both the UHF transmitter 54 and the infrared transmitter 56. Middle keys 62 operate the infrared transmitter only, and the trackball 64 and trackball keys 66a, 66b operate the UHF transmitter 54 only. It will be understood that the positioning of the keys can vary, so that top keys 58 will also be referred to as "combined keys" and middle keys 62 will be referred to as "infrared keys".

The infrared keys 62 are capable of emulating a broad range of conventional television remote control commands. In effect, these keys function as a "smart remote" that is capable of either learning the television's remote control commands or being designed to be compatible with a particular television 40. The trackball and trackball keys 64, 66a and 66b are used to communicate directly with the personal computer, for example to call up online television programming guide software and manipulate the online television program guide by cursor movement on screen. The combined keys 58 send both an infrared signal to the TV and a UHF signal to the personal computer.

The system 10 of FIG. 1 may also be operated in connection with an online television program guide as described in copending application Ser. No. 08/678,772 entitled "Methods and Systems for Providing Information to a Television Using a Personal Computer", filed on Jul. 11, 1996, the disclosure of which is hereby incorporated herein by reference. The general concept of an online television program guide is also described in the aforesaid U.S. Pat. Nos. 4,751,578 and 5,293,357 and will not be described in detail herein.

Accordingly, the embodiment of FIG. 1 allows an inexpensive card or cards to be added to a personal computer, to thereby allow the personal computer to control audio telephone communications. Expensive add-on boxes need not be provided, which would merely duplicate the computing power and memory which is already available in the personal computer.

The embodiment of FIG. 1 may require the user to separately tune the television channel using infrared signal 72, and separately control the personal computer using UHF or infrared commands 74. Moreover, the embodiment of FIG. 1 may only allow audio telephone communications to be controlled. In a second embodiment of the invention, described in FIG. 2, the personal computer may control tuning and other television functions using UHF television commands so that the user need not provide separate commands to the television. Moreover, the television may be used for video telephone communications. The embodiment of FIG. 2 may require a separate television interface unit which converts received UHF television commands to infrared television commands, and which contains a camera and microphone for video telephone communications.

Figure 2:
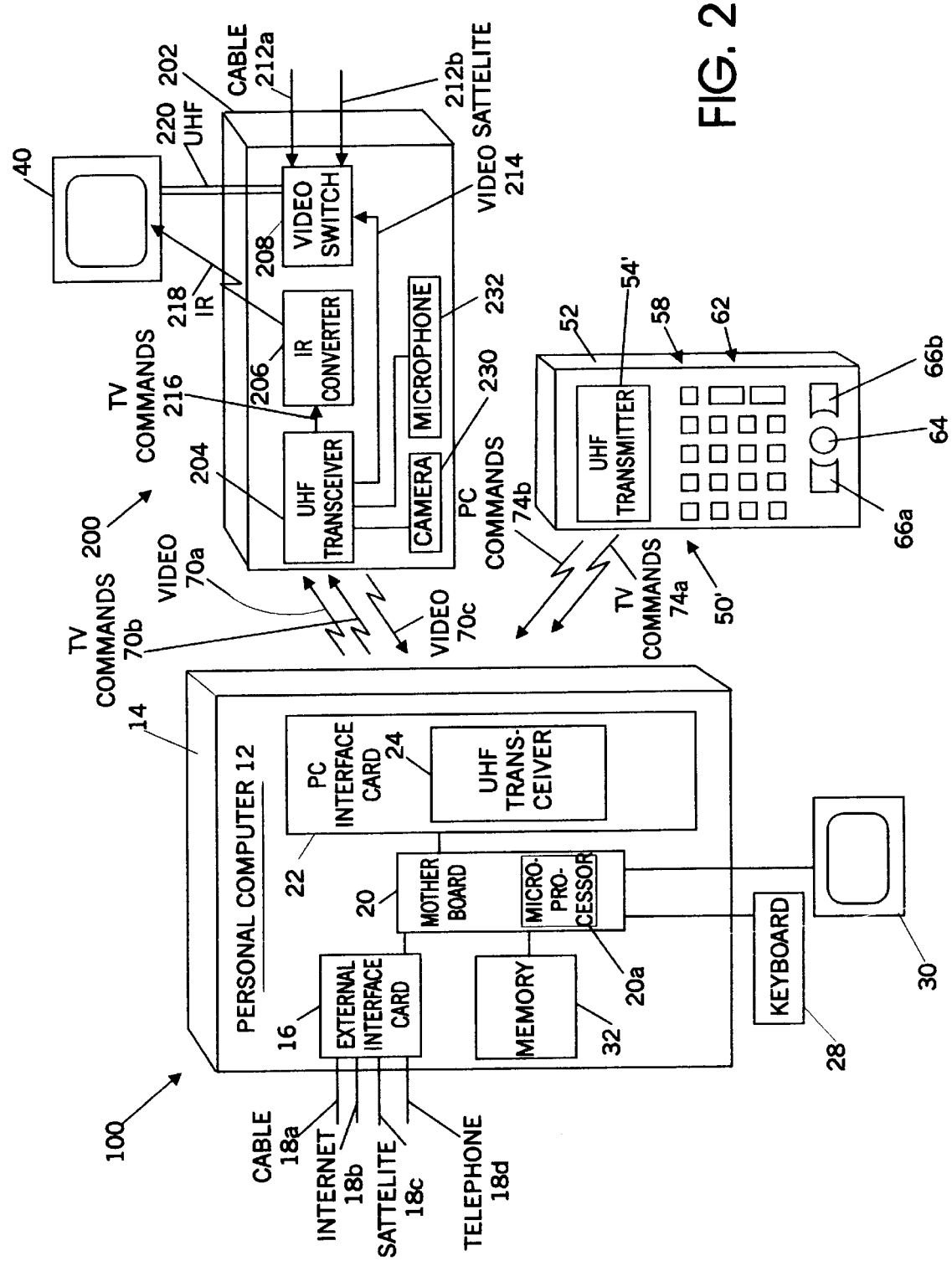
FIG. 2 illustrates a second embodiment of systems and methods for providing audio and/or video telephone communications using a personal computer and a television according to the present invention.

As shown in FIG. 2, system 100 includes a personal computer 12 as already described. Remote control unit 50' includes a UHF transmitter 54, but does not require a UHF receiver or an infrared transmitter. Activation of the combined keys 58, the conventional television keys 52 and the personal computer keys 64, 66a, 66b are all communicated to the personal computer 12 via UHF signals. The television commands from keys 58 and 62 are communicated as UHF television commands 74a, and the personal computer commands from keys 58 and keys 64, 66a and 66b are communicated as PC commands 74b.

Still referring to FIG. 2, television interface 200 includes a television interface housing 202. A UHF transceiver 204 in the housing receives television remote control signals 70b and television video signals 70a from the personal computer interface 22. The received television video signals are supplied to television 40 for display via video line 214, video switch 208 and UHF input 220. Video switch 208 may also be used to switch between conventional cable 212a and satellite 212b. UHF receiver 204 also supplies the television commands to an infrared converter 206 via line 216. Infrared converter 206 converts the received television remote control signals into infrared television remote control signals 218 for controlling the television in a conventional manner. It will also be understood that TV commands 74a may be received directly by television interface 200 from remote control 50', rather than using personal computer 12 as an intermediary.

Television interface 200 also includes a camera 230 and a microphone 232 for use as an audio/video input in video telephone communications. In video telephone communications, video telephone communication signals are received by external interface card from the internet 18b, from the telephone network 18d or from cable 18a or satellite 18c. The video telephone signals may be processed by personal computer 12, for example by filtering or other processing. The video telephone communications are then transmitted by UHF transceiver 24 to UHF transceiver 204 in television interface 200 as video signal 70a. It will also be understood that video signal 70a also includes audio therein.

The audio and video portions of the video telephone communications are displayed on television 40. Similarly, video telephone communications are received by camera 230 and microphone 232 and transmitted to UHF transceiver 24 in personal computer 12 via UHF transceiver 204 in television interface 200 as video signal 70c. The personal computer 12 then provides the video telephone communications to external interface card 16 for transmission to the external network as already described. Remote control 50' also controls video telephone communications via PC commands 74b.

Accordingly, a relatively simple television interface unit may be added to allow a television to be a focal point for video telephone communications, such as video conferencing, using the power of the personal computer. It will be understood that video telephone communications also generally include an audio portion, and that audio-only telephone communications may also be relayed, using the television as the focal point. It will also be understood that the television interface unit may include an infrared transmitter to allow control of a videocassette recorder or other remote device.

Accordingly, the embodiment of FIG. 2 remotely controls the television by accepting user input commands to remotely control a television from a wireless remote control, and transmits UHF remote control signals from the wireless remote control to a personal computer. The UHF remote control signals are received at the personal computer. They may be processed by the personal computer. Television remote control signals and television video signals are then transmitted from the personal computer to a television. The received television video signals are applied to the television for display. The received television remote control signals are converted into infrared television remote control signals to control the television. Personal computer commands may also be transmitted from the wireless remote control to the personal computer. Video telephone communications are also communicated between the personal computer and television interface, under control of the integrated remote control.

Other design considerations for the present invention will now be described. The UHF remote control units 50 and 50' preferably transmit on radio frequencies in order to extend the range to other rooms in the home. Specifically, the personal computer may not be located in the same room as the TV 40. It is generally preferable for the remote control units 50, 50' to be located within a line of sight of the TV so that the viewer may view the TV while operating a remote control. Therefore, to communicate with the personal computer 12, radio signals are preferred. UHF is preferred because UHF frequencies have been set aside by the Federal Communications Commission for remote control applications.

The PC interface card 22 also preferably includes the necessary functionality to demodulate the signals coming from the remote control, and to convert them into a format which is recognizable by a personal computer operating system. The UHF transceiver 24 transmits the instructions from the personal computer as initiated by the viewer using the UHF remote control and transmits them to the infrared converter. The UHF transceiver 24 also takes the video telephone communications and modulates them onto a UHF carrier to be transmitted to the UHF television receiver for display on the TV screen.

The television interface unit includes a UHF receiver 204, an infrared converter 206 and a video switch 208. The UHF receiver detects and demodulates the control codes transmitted by the PC interface to control the TV functions. The infrared converter decodes the control codes and retransmits them as infrared signals compatible with the TV set. The video switch 208 controls the selection of the incoming cable TV, off-air TV or satellite TV and also may control orientation of a remote antenna for reception.

A software package is preferably loaded onto the personal computer and uses the personal computer's processor and memory. The software may include audio and video telephone communications software. The software also can download remote control codes for television, thus enabling the viewer to control the particular television with the system's UHF hand-held remote control. All known codes may be maintained in a database accessible by the viewer.

These codes may enable operation of any television, satellite receivers or VCRs. The software may provide many other types of additional services such as descrambling, interactive video and the like.

Accordingly, the present invention allows the personal computer's full processing power and memory to be used to control telephone communications, with the addition of an external interface card and PC interface card to a personal computer. A special remote control 50 or 50' may also be required and a television interface unit 200 may also be required. The external interface card 16, PC interface card 22, remote control 50, 50' and television interface unit 200 do not require much or any computer processing power or memory, and accordingly may be produced inexpensively.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A general purpose personal computer comprising:
    a housing containing therein a processor and memory;
    a display responsive to the processor;
    a telephone interface in the housing, which obtains telephone communications from an external telephone network and sends telephone communications to the external telephone network; and
    a wireless communications transceiver in the housing, which is responsive to the processor and to the telephone interface, to wirelessly transmit telephone communications which are obtained from the external telephone network to external of the housing, and to wirelessly receive telephone communications from external of the housing and provide the received telephone communications to the telephone interface, wherein the wireless communications transceiver wirelessly transmits telephone communications to a wireless remote control external of the housing and wirelessly transmits to a television external of the housing.

2. A personal computer according to claim 1 wherein the external telephone interface comprises at least one of an audio telephone interface and a video telephone interface.

3. A personal computer according to claim 2 wherein the at least one of an audio telephone interface and a video telephone interface comprises at least one of a wire telephone interface and an internet interface.

4. A personal computer according to claim 1 wherein said wireless communications transceiver further comprises:
    a remote control receiver, which is responsive to wireless remote control signals, to control the processor and manipulate information in the memory.

5. A personal computer according to claim 4 wherein the remote control receiver is an infrared television remote control receiver.

6. A personal computer according to claim 1 in combination with a unified television/personal computer/telephone wireless remote control, which transmits remote control commands to a television in response to user inputs, which also transmits personal computer commands to the wireless communications transceiver in the housing in response to user inputs, and which also communicates telephone communications with the wireless communications transceiver.

7. A personal computer according to claim 1 in combination with a radio frequency remote control, which transmits personal computer commands and television remote control signals to the wireless communications transceiver in response to user inputs.

8. A personal computer according to claim 1 in further combination with a television interface unit, the television interface unit comprising:
    a wireless communications receiver which receives telephone communications from the personal computer and which also receives television remote control commands from the personal computer; and
    a converter which is responsive to the wireless communications receiver, and which converts the received television remote control commands into infrared television remote control commands.

9. A personal computer according to claim 8 wherein the television interface unit further comprises:
    a television camera;
    a microphone; and
    a radio frequency transmitter which is responsive to the television camera and to the microphone, to transmit video telephone communications to the personal computer.

10. A method of providing telephone communications using a personal computer, comprising the steps of:
    obtaining at the personal computer, telephone communications from an external telephone network;
    wirelessly receiving telephone remote control signals at the personal computer, in response to user inputs at a wireless remote control; and
    wirelessly transmitting the telephone communications from the personal computer to the wireless remote control wirelessly transmitting the telephone communications from the personal computer to a television.

11. A method according to claim 10 wherein the obtaining step comprises the step of obtaining audio telephone communications or video telephone communications from the external telephone network.

12. A method according to claim 11 wherein the external telephone network is at least one of a wired telephone network and the internet.

13. A method according to claim 10 wherein the step of wirelessly transmitting comprises the step of wirelessly transmitting video telephone communications to the television.

14. A method according to claim 10 wherein the wirelessly receiving step comprises the step of receiving infrared telephone remote control signals at the personal computer.

15. A method according to claim 10 further comprising the step of:
    wirelessly transmitting video telephone communication control signals from the wireless remote control to the television, in response to user inputs at the wireless remote control.

16. A method according to claim 10:
    wherein the step of wirelessly receiving comprises the step of wirelessly receiving audio telephone communications at the personal computer from the wireless remote control; and
    wherein the step of wirelessly transmitting comprises the step of wirelessly transmitting audio telephone communications from the personal computer to the wireless remote control.

17. A method according to claim 10 wherein the step of wirelessly transmitting comprises the step of wirelessly transmitting video telephone communications from the personal computer to the television; and wherein the method further comprises the step of wirelessly receiving video telephone communications at the personal computer from a remote unit.

18. A video telephone system comprising:

a personal computer interface, adapted for use with a personal computer, and including a video telephone network interface and a first radio frequency transceiver which transmits video telephone communications and receives video telephone communications; and a television interface, adapted for use with a television, and including a second radio frequency transceiver which receives video telephone communications from the personal computer interface, and which applies the received video telephone communications to a television for display, and which also includes a video camera and a microphone to provide video telephone communications to the second radio frequency transceiver, for transmission to the first radio frequency transceiver; and a wireless remote control, including a user interface which accepts user input commands to remotely control a television external of the personal computer, and a third radio frequency transmitter which transmits radio frequency remote control signals to the first radio frequency transceiver to remotely control the personal computer in response to user input commands at the user interface.

19. A video telephone system according to claim 18 wherein the personal computer interface also relays television remote control signals which are received by the first radio frequency transceiver, to the second radio frequency transceiver.

20. A video telephone system according to claim 19 wherein the personal computer interface also receives personal computer commands from the first radio frequency transceiver, and relays the personal computer commands to a personal computer.

21. A video telephone system according to claim 18 wherein the personal computer interface is contained on a card which connects to a personal computer motherboard in a personal computer housing.

22. A video telephone system according to claim 18 wherein the television interface further comprises a radio frequency switch which switches a video input of a television, between the received video telephone communications and an external video source.

23. A video telephone system according to claim 18 wherein the wireless remote control user interface also accepts user input commands to remotely control a personal computer, and wherein the radio frequency transmitter also transmits radio frequency personal computer control signals to the first radio frequency transceiver to remotely control a personal computer in response to user input commands at the user interface.

24. A video telephone system according to claim 18 wherein the television interface further converts received television remote control signals into infrared television remote control signals.

25. A telephone communications interface for a general purpose personal computer comprising:

a radio frequency transceiver which wirelessly transmits and receives telephone communications and television and wirelessly transmits to under control of a personal computer; and an external telephone network interface which transmits and receives the telephone communications between the radio frequency transceiver and an external wire telephone network, under control of the personal computer.

26. An interface according to claim 18 wherein the radio frequency transceiver also wirelessly receives personal computer commands, and relays the personal computer commands to a personal computer.

27. An interface according to claim 25 wherein the radio frequency transceiver and the external telephone network interface are contained on a card which connects to a personal computer motherboard in a personal computer housing.

* * * * *